(12) United States Patent
Yamazaki et al.

(10) Patent No.: US 11,442,301 B2
(45) Date of Patent: Sep. 13, 2022

(54) DISPLAY DEVICE

(71) Applicant: ALPINE ELECTRONICS, INC., Tokyo (JP)

(72) Inventors: Makoto Yamazaki, Iwaki (JP); Takahiro Akamura, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 208 days.

(21) Appl. No.: 16/741,090

(22) Filed: Jan. 13, 2020

(65) Prior Publication Data

US 2020/0233259 A1 Jul. 23, 2020

(30) Foreign Application Priority Data

Jan. 21, 2019 (JP) .............................. JP2019-007791

(51) Int. Cl.
*G02F 1/1333* (2006.01)
*B60K 35/00* (2006.01)

(52) U.S. Cl.
CPC ........ *G02F 1/133308* (2013.01); *B60K 35/00* (2013.01); *B60K 2370/152* (2019.05); *G02F 1/13332* (2021.01); *G02F 1/133331* (2021.01)

(58) Field of Classification Search
CPC .............. B60K 2370/152; B60K 35/00; G02F 1/133308; G02F 1/133317; G02F 1/13332; G02F 1/133331; G02F 2201/46; G02F 2201/503
See application file for complete search history.

(56) References Cited

U.S. PATENT DOCUMENTS

| | | | | |
|---|---|---|---|---|
| 3,743,801 A * | 7/1973 | Brobeck | ................ | H01H 35/24 200/61.25 |
| 4,688,074 A * | 8/1987 | Iinuma | ................ | G02F 1/13452 349/151 |
| 5,801,542 A * | 9/1998 | Kajiwara | ........... | G01R 31/2831 324/756.02 |
| 6,577,288 B1 * | 6/2003 | Min | ...................... | G06F 1/1601 345/87 |
| 11,026,336 B1 * | 6/2021 | He | ....................... | H05K 5/0226 |
| 2002/0044329 A1 * | 4/2002 | Shoji | ...................... | H05K 1/147 359/245 |

(Continued)

FOREIGN PATENT DOCUMENTS

| | | |
|---|---|---|
| JP | 2005079865 A | 3/2005 |
| JP | 2016-122151 | 7/2016 |
| WO | WO2013187281 A1 | 12/2013 |

OTHER PUBLICATIONS

Extended European Search Report for 20152419.6 dated Apr. 1, 2020, 6 pgs.

(Continued)

*Primary Examiner* — Peter D Le
(74) *Attorney, Agent, or Firm* — Crowell & Moring LLP

(57) ABSTRACT

In a display unit, a display cell and a backlight device are provided in a bracket. A support member is arranged on the side of a display screen of the display unit, and the support member is provided with a support piece that can be elastically deformed in a front-rear direction. The front panel is bonded to the bracket of the display unit by a first adhesive layer and is bonded to the support piece by a second adhesive layer.

14 Claims, 12 Drawing Sheets

(56) References Cited

U.S. PATENT DOCUMENTS

| | | | |
|---|---|---|---|
| 2002/0047974 A1* | 4/2002 | Matsumoto | G02F 1/134363 349/141 |
| 2002/0080297 A1* | 6/2002 | Sung | G06F 1/1601 349/58 |
| 2002/0126248 A1* | 9/2002 | Yoshida | G02F 1/13452 349/149 |
| 2002/0171783 A1* | 11/2002 | Yang | G02F 1/133308 349/58 |
| 2003/0011736 A1* | 1/2003 | Ha | G06F 1/1601 349/149 |
| 2005/0062899 A1* | 3/2005 | Fukayama | G02F 1/133308 349/58 |
| 2005/0190336 A1* | 9/2005 | Chen | G02F 1/13394 349/155 |
| 2005/0212991 A1* | 9/2005 | Sugawara | G02F 1/133308 349/58 |
| 2007/0218732 A1* | 9/2007 | Honda | H04R 1/021 439/188 |
| 2008/0310094 A1* | 12/2008 | Burns | G06F 1/1616 361/679.01 |
| 2009/0185104 A1* | 7/2009 | Watanabe | G02F 1/13452 349/60 |
| 2010/0073582 A1* | 3/2010 | Konno | G02F 1/133308 348/794 |
| 2011/0049000 A1* | 3/2011 | Ishibashi | B65D 81/053 206/521 |
| 2014/0232969 A1 | 8/2014 | Tsubaki et al. | |
| 2015/0055053 A1* | 2/2015 | Sasaoka | G02F 1/133308 349/58 |
| 2015/0168767 A1 | 6/2015 | Yonemura | |
| 2015/0212363 A1* | 7/2015 | Nakazawa | G02F 1/133308 349/60 |
| 2016/0183399 A1 | 6/2016 | Lee et al. | |
| 2016/0195770 A1* | 7/2016 | Fukai | G02F 1/133606 362/97.1 |

OTHER PUBLICATIONS

Notification of Reasons for Refusal from corresponding Japanese Application No. 2019-007791, dated Feb. 22, 2022, 5pp (including English translation).

* cited by examiner

DISPLAY DEVICE

RELATED APPLICATION

The present application claims priority to Japanese Patent Application Number 2019-007791, filed Jan. 21, 2019, the entirety of which is hereby incorporated by reference.

BACKGROUND

1. Field of the Invention

The present invention relates to a display device having a structure in which bending stress acting on a display cell is reduced to make display unevenness hardly occur.

2. Description of the Related Art

An in-vehicle display device includes a display unit having a display cell. A support base is incorporated in a dashboard or an instrument panel inside a passenger compartment of an automobile, and the display cell is supported on the support base. A light-transmissive front panel is installed on a front side of the display unit, and an image generated by the display cell is displayed through the front panel. In this type of display device, there is a problem that the display cell is affected by stress acting on the support base at the time of being fixed inside a vehicle body. When a large stress acts on the display unit, there is a problem that distortion occurs in the display cell so that display unevenness occurs. In recent years, an IPS liquid crystal cell has been used to secure a wide viewing angle. However, when bending stress or torsional stress acts on the liquid crystal cell, black unevenness (brightness unevenness) is likely to occur.

JP 2016-122151 A describes an invention relating to a display device in which bending stress acting on a display cell is reduced to make display unevenness hardly occur.

This display device has a support serving as a decorative panel, and a bracket formed using a metal plate is provided inside a display window formed in the support. The display cell and a backlight are supported on the bracket. A front panel formed using a light-transmissive plate material, such as a glass plate, is attached to a front surface of the display cell with a touchpad therebetween. Further, an edge part of the front panel is bonded and fixed to a support surface which is a front surface of the support. The bracket is integrally formed with a plurality of mounting pieces, and each of the mounting pieces and the support are fixed by a fixing mechanism using a mounting screw.

In the assembly of the display device, the front panel fixed to the front surface of the display cell is first bonded and fixed to the support surface which is the front surface of the support. Thereafter, the mounting piece is screwed to the support in the fixing mechanism. In this fixing mechanism, an inner diameter of a mounting hole formed in the mounting piece is opened to be sufficiently larger than a diameter of a shaft of the mounting screw, and relative fixing positions of the mounting piece and the support can be changed in a direction perpendicular to a display screen. In a process after bonding the front panel fixed to the display cell to the support surface of the support, the mounting piece and the support are fixed by the fixing mechanism after adjusting the relative positions thereof in the direction perpendicular to the display screen so that a large stress does not act on the bracket, and bending stress acting on the display cell can be reduced.

In the display device described in JP 2016-122151 A, however, the front panel is fixed to both the front surface of the display cell and the support surface of the support that is the decorative panel. Therefore, even if the screwing has been performed in the fixing mechanism by adjusting the relative positions of the mounting piece and the support in the direction perpendicular to the display screen, it is difficult to completely eliminate a phenomenon in which a force generated at a bonding portion between the support and the front panel applies stress to the display cell.

Further, it is also possible to consider using a structure in which a front panel and a support surface of a support are not bonded. However, for example, when adopting a structure in which the front panel is bonded only to a frame of a bracket provided in a display unit, support strength of the front panel is not sufficient with the structure in which the front panel is not bonded to the support, and there is a risk that problems, such as peeling of the front panel from the display unit and deviation of relative positions of the front panel and the display unit, may occur when a large impact is applied to the front panel.

The summary of the present disclosure solves the above conventional problems, and an object thereof is to provide a display device that can enhance bonding strength of a front panel by bonding the front panel to a support member located alongside of a display unit and further can reduce a phenomenon that a force generated at a bonding portion between the front panel and the support member acts on a display cell.

The present disclosure describes a display device including a display unit having a display cell, and a light-transmissive front panel located on a front side of the display unit, characterized in that a support member is provided alongside of the display unit, the support member is formed with support pieces that are elastically deformable in a direction intersecting a surface of the front panel, and the front panel is bonded to both the display unit and the support piece.

In the display device of the present disclosure, free ends of the support pieces face a lower side or an upper side which is a gravity direction. Alternatively, the free ends of the support pieces face a lateral direction that is a direction intersecting the gravity direction in the display device of the present disclosure.

It is preferable that, in the display device of the present disclosure, the support pieces are provided on both sides of the display unit, and the free ends face directions of separating from each other in the support piece provided on one side and the support piece provided on the other side with the display unit therebetween.

It is preferable that, in the case where the free end of the support piece faces the lateral direction, a rear member is provided on the rear side opposite to a display direction with respect to the support member, and a restriction mechanism for restricting deformation of the support piece in the gravity direction be provided between the support piece and the rear member.

Further, it is preferable that the display device of the present disclosure is provided with a rear member on the rear side opposite to the display direction of the support member, and a gap in the front-rear direction be formed between the support piece and the rear member. In this case, at least one of the support piece and the rear member can be provided with an abutment protrusion that restricts the support piece from approaching the rear member.

In the present disclosure, the front panel is bonded to both the support piece formed in the support member and the display unit, and thus, bonding strength of the front panel can be sufficiently enhanced. For example, even in a structure in which the front panel is bonded only to a frame of a bracket constituting the display unit, the front panel can be supported by the support piece, and thus, the bonding strength of the front panel can be sufficiently increased. Therefore, anti-impact strength can be enhanced even if the front panel is a glass plate having a relatively large area. Further, anti-vibration strength can be enhanced when the vehicle is subjected to vibrations. Moreover, the support member is provided with the support piece that can be elastically deformed, and the front panel is bonded to the support piece, and thus, it is possible to reduce the stress applied to the display cell by an adhesive force between the front panel and the support member.

DETAILED DESCRIPTION OF THE PREFERRED EMBODIMENTS

Figure 1A:
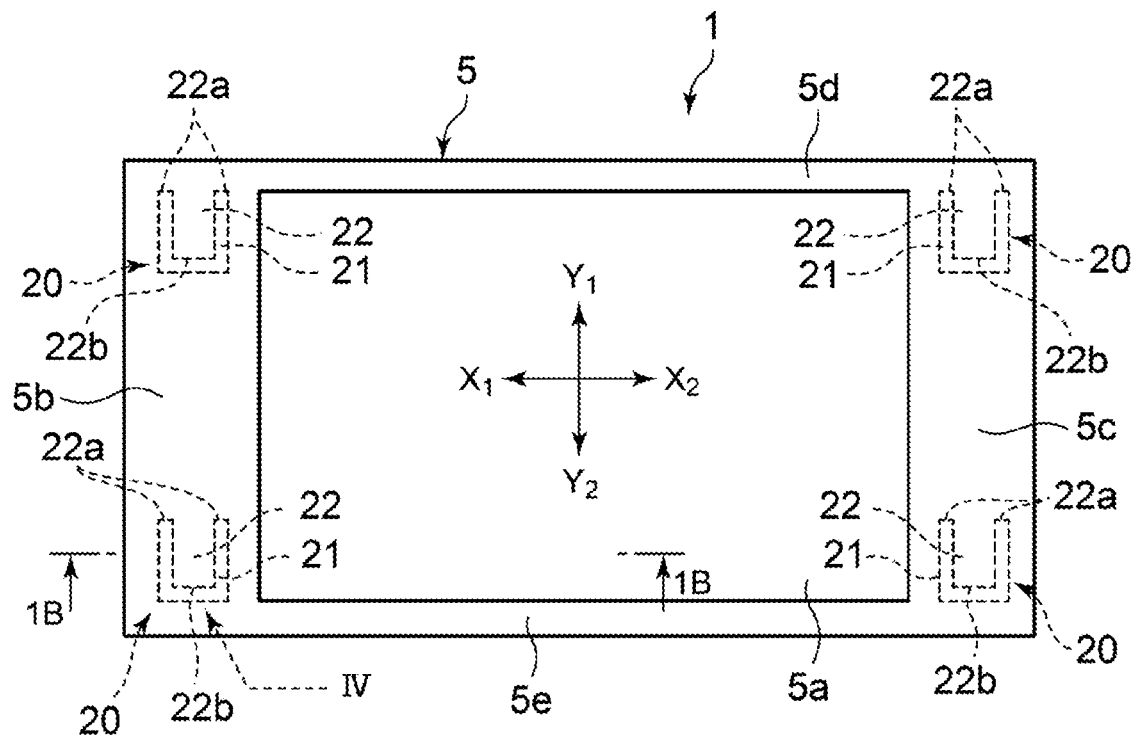
FIG. 1A is a front view illustrating a display device according to a first embodiment of the present invention.
Figure 1B:
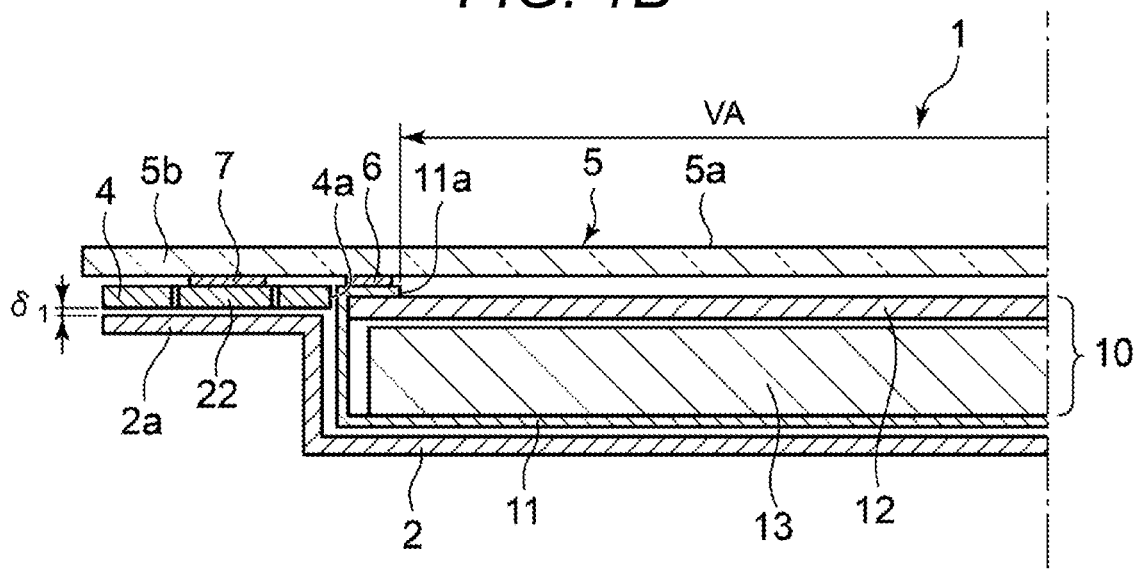
FIG. 1B is a half cross-sectional view taken along a line 1B-1B of FIG. 1A.
Figure 1B:
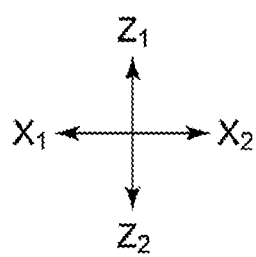
Figure 2A:
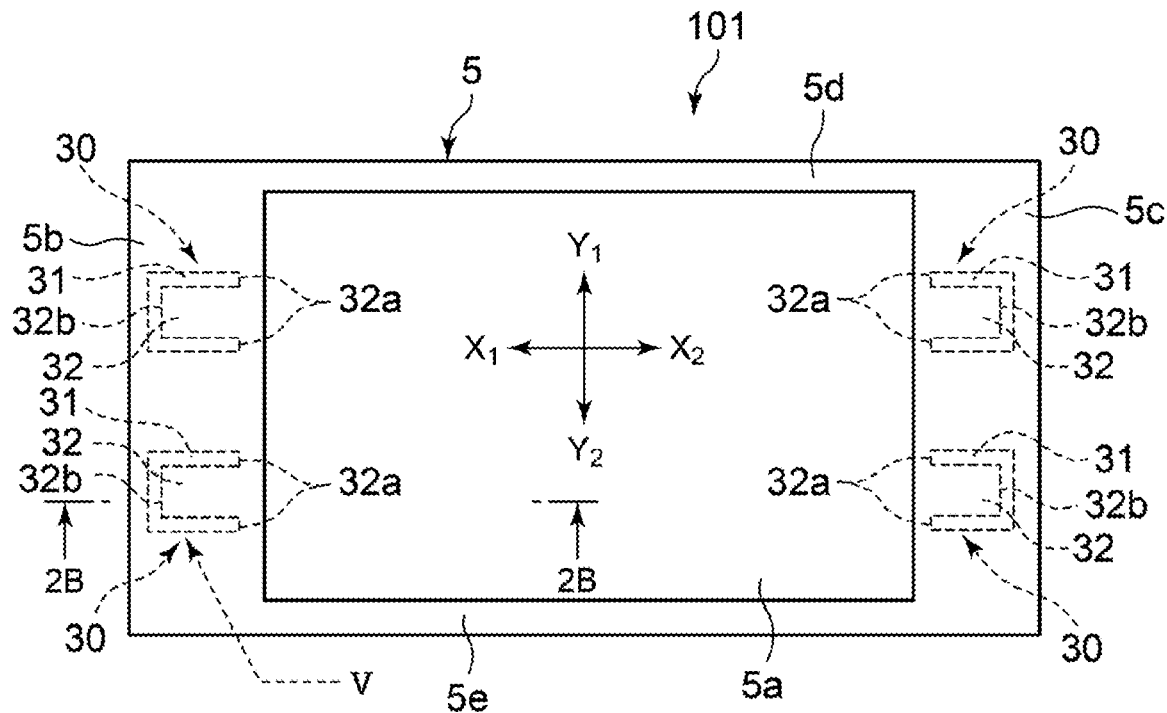
FIG. 2A is a front view illustrating a display device according to a second embodiment of the present invention.
Figure 2B:
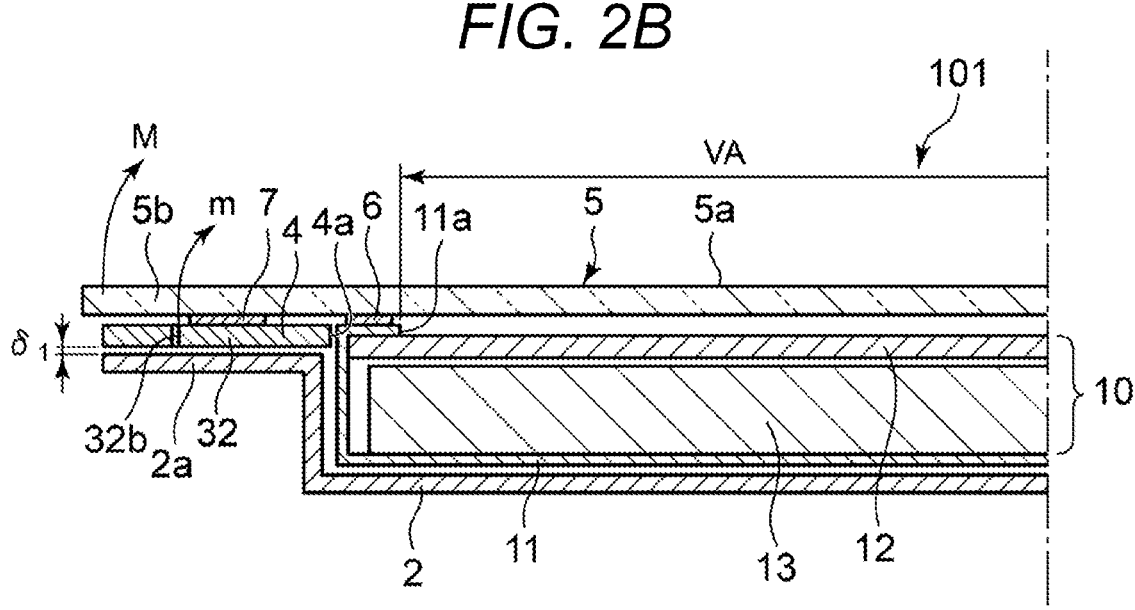
FIG. 2B is a half cross-sectional view taken along a line 2B-2B of FIG. 2A.
Figure 2B:
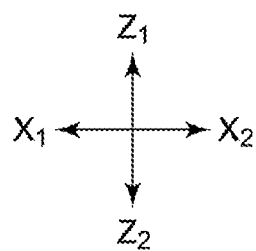
Figure 3:
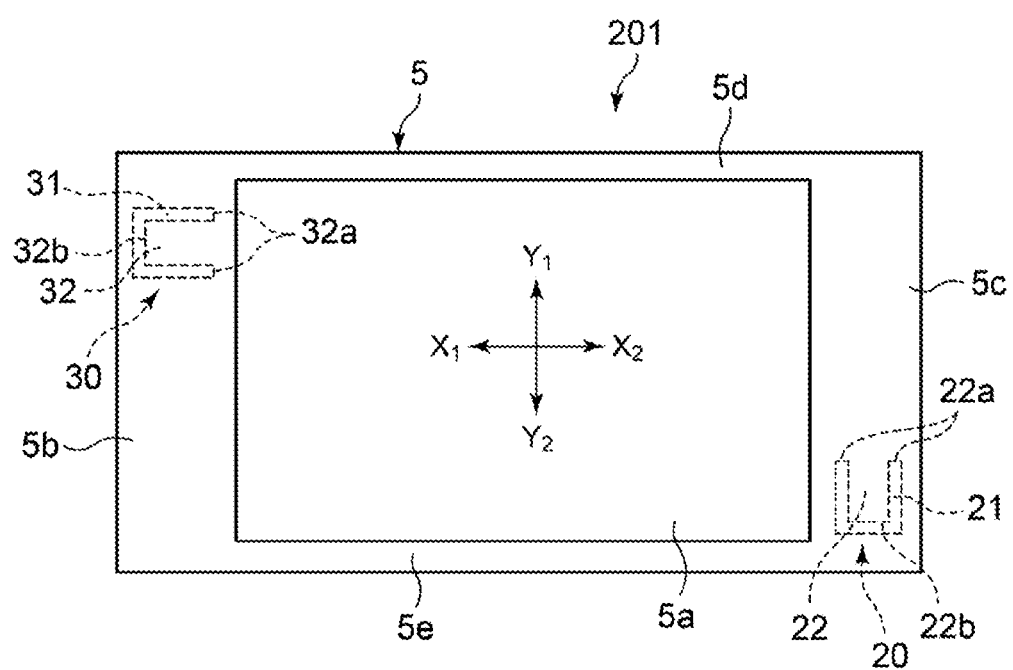
FIG. 3 is a front view illustrating a display device according to a third embodiment of the present invention.

FIG. 1A illustrates a front view of a display device 1 according to a first embodiment, and FIG. 1B illustrates a cross-sectional view of the display device 1. FIG. 2A illustrates a front view of a display device 101 according to a second embodiment, and FIG. 2B illustrates a cross-sectional view of the display device 101. FIG. 3 illustrates a front view of a display device 201 according to a third embodiment.

All the display devices are in-vehicle display devices. A Z1 direction is a front side which is a display direction; a Z2 direction is a rearward or back direction; a Y1 direction is an upper side; a Y2 direction is a lower side which is a direction of gravity; an X1 direction is a left lateral direction intersecting (orthogonal to) the gravity direction, and an X2 direction is a right lateral direction intersecting (orthogonal to) the gravity direction.

As illustrated in FIGS. 1B and 2B, each of the display devices 1, 101, and 201 has a display unit 10. The display unit 10 has a bracket 11. The bracket 11 is formed by bending a metal plate. In the display unit 10, a display cell 12 and a backlight device 13 are held by the bracket 11. The display cell 12 is a liquid crystal cell or an EL cell. The display cell 12 of the embodiment is a color liquid crystal display cell, and is an IPS liquid crystal display cell that can ensure a wide viewing angle. The display cell 12 includes a liquid crystal layer between opposing transparent substrates, an electrode layer forming a pixel, and a color filter, and a polarizing plate and the like are further stacked therein. The backlight device 13 is constituted by: a light-transmissive light guide plate such as an acrylic plate; a reflective member provided on the back of the light guide plate; and a light source such as an LED that allows light to enter the light guide plate. The backlight device 13 may be in close contact with the display cell 12 or may oppose the display cell 12 with a gap.

The display cell 12 and the backlight device 13 are bonded inside the bracket 11 formed in a box shape or fixed by being pinched with a support claw or the like. As illustrated in FIGS. 1B and 2B, a frame (picture frame portion) 11a having a shape to surround the display cell 12 is formed to be bent in the bracket 11 on the front side (in the Z1 direction) which is the display direction. In the display unit 10, a region surrounded by the frame 11a on the front side is a display screen VA.

The display device 1 has a support base 2. The support base 2 is formed by die casting using a light metal material. The bracket 11 of the display unit 10 is fixed to the support base 2 by a fixing unit such as screwing and an uneven fitting structure. A rear member 2a, which has a flange structure protruding in the X1 direction and the X2 direction from the display screen VA and protruding in the Y1 direction and the Y2 direction is integrally formed in a portion on the front side (in the Z1 direction) of the bracket 11. The support base 2 is incorporated in a dashboard or an instrument panel provided inside a passenger compartment of an automobile, and is screwed to a vehicle body or screwed to an accessory member fixed to the vehicle body.

As illustrated in FIGS. 1B and 2B, a support member 4 is provided on the front side of the rear member 2a integrated with the support base 2. The support member 4 is made of a synthetic resin material, and is fixed to the support base 2 using a fixing screw or the like so as to prevent mutual movement. A square window 4a is opened in the support member 4, and the display unit 10 is located inside the window 4a. As a result, the support member 4 is located alongside of the display unit 10 in left and right lateral directions (X1-X2 direction) and a vertical direction (Y1-Y2 direction). In the display device 1 illustrated in FIG. 1A, a first bonding portion 20 is provided in a portion alongside of the display unit 10 in the left lateral direction (the X1 direction) and the right lateral direction (the X2 direction). The display device 101 illustrated in FIG. 2A is provided with a second bonding portion 30. The display device 201 illustrated in FIG. 3 is provided with both the first bonding portion 20 and the second bonding portion 30. As illustrated in FIGS. 1B and 2B, a slight gap 61 is formed in a front-rear direction (Z1-Z2 direction) between the support member 4 and the rear member 2a located on the rear side of the support member 4, in a region where the first bonding portion 20 or the second bonding portion 30 is provided.

Each of the display devices 1, 101, and 201 includes a front panel 5 on the front side (in the Z1 direction). The front panel 5 is light-transmissive and is formed using a glass plate. However, the front panel 5 may be an acrylic synthetic resin plate. A touch panel is superimposed and pasted onto a surface of the front panel 5 facing the rear side (the Z2 direction). Since this touch panel is provided, it is possible to detect which position on the front panel 5 an operator's finger has touched.

As illustrated in FIGS. 1A, 2A, and 3, a region covering the front side of the display screen VA generated by the display cell 12 is a display screen transmissive region 5a in the front panel 5. A width dimension in the lateral direction (the X1-X2 direction) and a height dimension in the vertical direction (the Y1-Y2 direction) of the front panel 5 are larger than a width dimension and a height dimension of the display screen VA, and the front panel 5 has: a left extension 5b extended in the left lateral direction (the X1 direction) from the display screen transmissive region 5a; a right extension 5c extended in the right lateral direction (the X2 direction); an upper extension 5d extended to the upper side (in the Y1 direction), and a lower extension 5e extended to the lower side (in the Y2 direction).

The front panel 5 is bonded to a front surface of the frame (frame portion) 11a formed on the bracket 11 of the display unit 10 via a first adhesive layer 6. Further, the left extension 5b and the right extension 5c of the front panel 5 are bonded to the support member 4 via a second adhesive layer 7 in the first bonding portion 20 or the second bonding portion 30. The first adhesive layer 6 and the second adhesive layer 7 are double-sided adhesive tapes. Alternatively, the first adhesive layer 6 and the second adhesive layer 7 may be formed by applying a UV-curable adhesive or a drying-curable adhesive.

Figure 4:
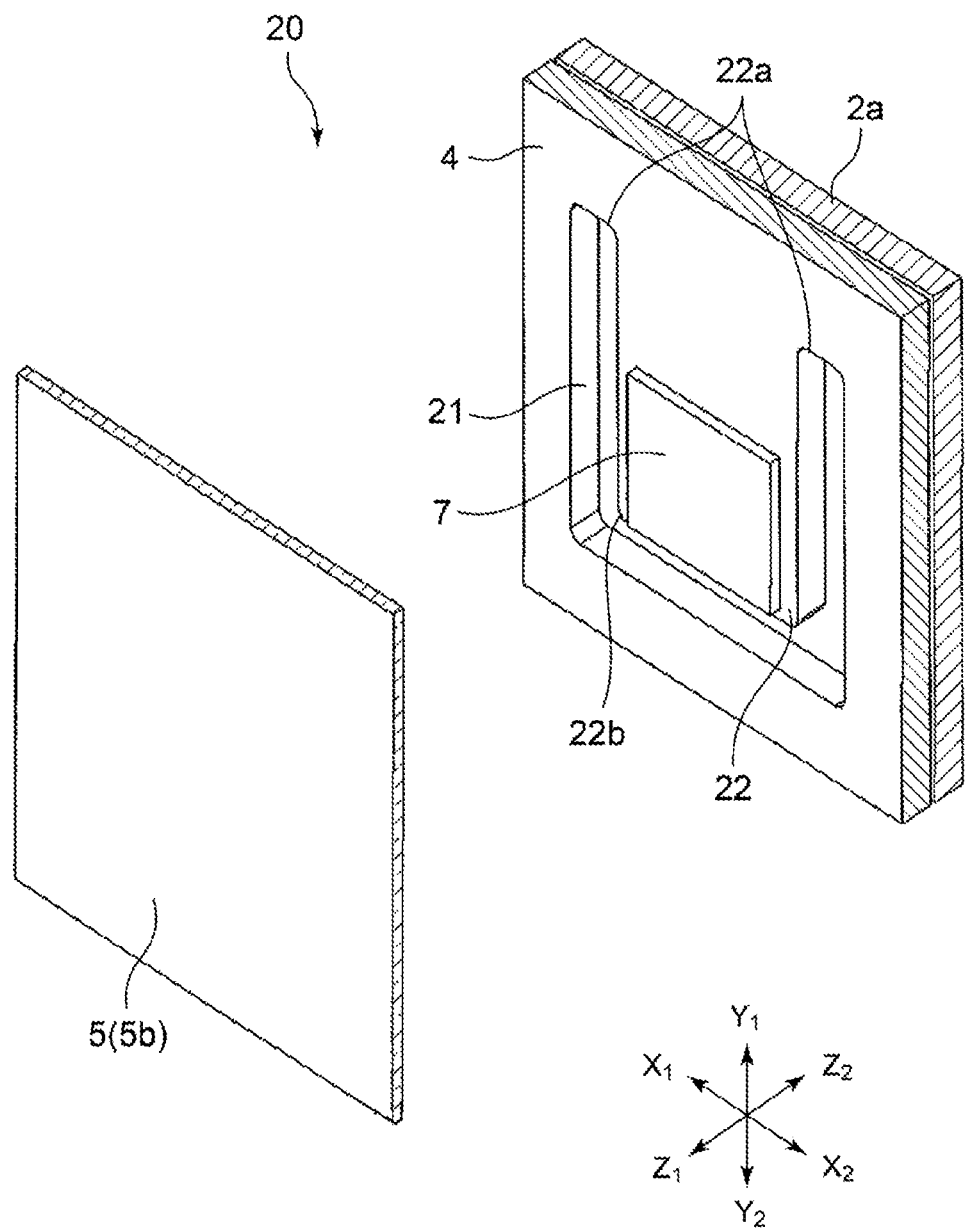
FIG. 4 is a partially exploded perspective view illustrating a structure of a first bonding portion indicated by an arrow IV in FIG. 1A.

FIG. 4 is an exploded perspective view of the first bonding portion 20 indicated by an arrow IV in the front view of FIG. 1A.

In the first bonding portion 20, a support piece 22, surrounded in three directions with a U-shaped opening 21, is integrally formed in the support member 4. The support piece 22 has a proximal end 22a that is a boundary with the other portions of the support member 4, and a free end 22b that is located to be separated from the proximal end 22a and is not continuous with the other portions of the support member 4. The support piece 22 has a rectangular shape, and can be deformed to be bent (elastically deformed) in the front-rear direction (the Z1-Z2 direction), which is the direction intersecting the surface of the front panel 5, with the proximal end 22a as a fulcrum. In the first bonding portion 20, the free end 22b of the support piece 22 faces the lower side (the Y2 direction), which is a direction in which gravity acts. Further, a surface facing the front side (the Z1 direction) of the support piece 22 is bonded and fixed to the left extension 5b and the right extension 5c of the front panel 5 by the second adhesive layer 7.

Figure 5:
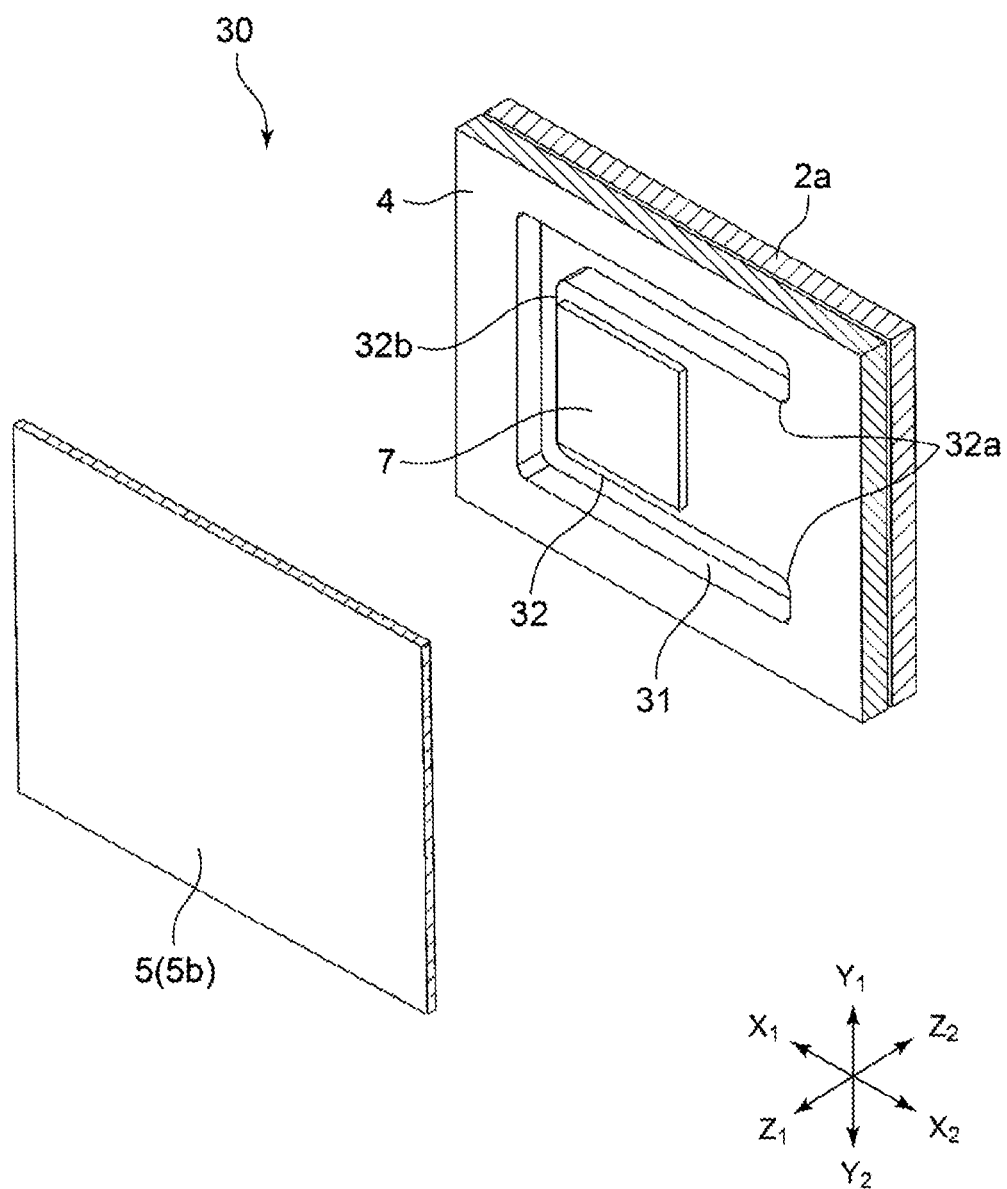
FIG. 5 is a partially exploded perspective view illustrating a structure of a second bonding portion indicated by the arrow V in FIG. 2A.

FIG. 5 is an exploded perspective view of the second bonding portion 30 indicated by an arrow V in the front view of FIG. 2A.

In the second bonding portion 30, a support piece 32, surrounded in three directions with a U-shaped opening 31, is integrally formed in the support member 4. The support piece 32 has a proximal end 32a that is a boundary with the other portions of the support member 4, and a free end 32b that is located to be separated from the proximal end 32a and is not continuous with the other portions of the support member 4. The support piece 32 has a rectangular shape, and can be deformed to be bent (elastically deformed) in the front-rear direction (the Z1-Z2 direction), which is the direction intersecting the surface of the front panel 5, with the proximal end 32a as a fulcrum. In the second bonding portion 30, the free end 32b of the support piece 32 faces the lateral direction (the X1 direction or the X2 direction) that is the direction intersecting the gravity direction. Further, a surface facing the front side (the Z1 direction) of the support piece 32 is bonded and fixed to the left extension 5b and the right extension 5c of the front panel 5 by the second adhesive layer 7.

In all the display device 1 illustrated in FIGS. 1A and 1B, the display device 101 illustrated in FIGS. 2A and 2B, and the display device 201 illustrated in FIG. 3, the front panel 5 is bonded and fixed to the frame 11a, formed on the bracket 11 which is a part of the display unit 10, by the first adhesive layer 6, and the left extension 5b and the right extension 5c of the front panel 5 are bonded and fixed to the support piece 22 or the support piece 32 formed on the support member 4 at a plurality of sites by the second adhesive layer 7. Therefore, even if the front panel 5 is formed using a glass plate having a relatively large size and a larger area than the display screen VA, the bonding and fixing strength of the front panel 5 can be sufficiently enhanced. Since the bonding and fixing strength of the front panel 5 is high, defects, such as falling-off and positional deviation of the front panel 5, can be suppressed even when an unexpected impact is applied to the display device.

In the first bonding portion 20 or the second bonding portion 30, the support piece 22 or the support piece 32 can be elastically deformed and bent in the direction intersecting the surface of the front panel 5. Therefore, even if positions in the front-rear direction of a plurality of bonding portions that fix the support member 4 and the front panel 5 vary, the support piece 22 or the support piece 32 can be bent and deformed following such variations. Accordingly, the influence exerted on the display cell 12 by a fixing force that bonds the front panel 5 and the support member 4 can be reduced in the first bonding portion 20 or the second bonding portion 30. Since stress and distortion acting on the display cell 12 can be reduced, the display quality on the display screen VA is not degraded, and black unevenness (brightness unevenness) or the like caused by bending distortion hardly occurs even if the display cell 12 is the IPS liquid crystal display cell.

Further, a gap δ1 is formed in the front-rear direction (the Z1-Z2 direction) between the support member 4 and the rear member 2a located on the rear side of the support member 4 in a region where the first bonding portion 20 or the second bonding portion 30 is formed as illustrated in FIGS. 1B and 2B, so that the support piece 22 or the support piece 32 can be bent not only to the front side (in the Z1 direction) but also to the rear side (in the Z2 direction). Therefore, when fixing the display device 1, 101, or 201 to a vehicle, the distortion acting on the front panel 5 toward the front side and the rear side can be effectively absorbed by the elastic deformation of the support piece 22 or 32 in the front-rear direction.

In the display device 1 of the first embodiment illustrated in FIG. 1A, the free end 22b of the support piece 22 provided in the first bonding portion 20 faces the lower side (the Z2 direction) along the gravity direction, and thus, a phenomenon, such as breakage of the support piece 22, hardly occurs, for example, even if a large impact and acceleration in the gravity direction act on the front panel 5.

In the display device 1 illustrated in FIG. 1A, the free ends 22b of the support pieces 22 face the lower side (the Z2 direction) in all the first bonding portions 20. Thus, when distortion in a rotational direction about an axis oriented in the lateral direction (the X1-X2 direction) acts on the front panel 5, this distortion is easily absorbed by the bending of each of the support pieces 22.

Note that the support piece 22 can also be arranged such that the free end 22b faces the upper side (the Y1 direction) in the first bonding portion 20. For example, in the display device 1 illustrated in FIG. 1A, the free ends 22b of the support pieces 22 can be opposite to each other in the vertical direction between the first bonding portion 20 located on the lower side and the first bonding portion 20 located on the upper side by arranging the free end 22b of the support piece 22 of the first bonding portion 20 located on the lower side to face the lower side (the Y2 direction) and the free end 22b of the support piece 22 of the first bonding portion 20 located on the upper side to face the upper side (the Y1 direction). In this structure, regardless of any direction of the distortion in the rotational direction about the axis oriented in the lateral direction acting on the front panel 5, the distortion is easily absorbed by bending of the support piece 22 of each of the first bonding portions 20.

In the display device 101 illustrated in FIG. 2A, the free end 32b of the support piece 32 faces the left lateral direction (the X1 direction) in the second bonding portion 30 provided in the left extension 5b, the free end 32b of the support piece 32 faces the right lateral direction (the X2 direction) in the second bonding portion 30 provided in the right extension 5c, and the free ends 32b of the support pieces 32 face the directions opposite to each other in the lateral direction between the second bonding portion 30 provided on the left extension 5b and the second bonding portion 30 provided on the right extension 5c. Therefore, as illustrated in FIG. 2B, the support piece 32 is likely to generate distortion m in a rotational direction about an axis oriented in the vertical direction (the Y1-Y2 direction) in the left and right second bonding portions 30, and the rotational directions of the distortion m are opposite to each other on the left side and the right side. Therefore, when the distortion M in the rotational direction about the axis oriented in the vertical direction, that is, "warpage" having a curvature in the X1-X2 direction acts on the front panel 5, the distortion (warpage) is easily absorbed by the elastic deformation of the support piece 32 of each of the second bonding portions 30.

In the display device 201 illustrated in FIG. 3, both the first bonding portion 20 and the second bonding portion 30 are used to bond and fix the front panel 5 to the support member 4. The second bonding portion 30 is provided in the left extension 5b of the front panel 5, and the free end 32b of the support piece 32 faces a left edge of the front panel 5. The first bonding portion 20 is provided in the right extension 5c of the front panel 5, and the free end 22b of the support piece 22 faces the lower side (the Y2 direction). Alternatively, the free end 22b may face the upper side (the Y1 direction). In this display device 201, the support piece 32 of the second bonding portion 30 is easily bent when the distortion in the rotational direction about the axis oriented in the vertical direction is applied to the front panel 5, and the support piece 22 of the first bonding portion 20 is easily bent when the distortion in the rotational direction about the axis oriented in the lateral direction is applied. Therefore, the bending stress applied to the front panel 5 from multiple directions can be alleviated, and it becomes easy to prevent large stress from acting on the display cell 12.

Figure 6:
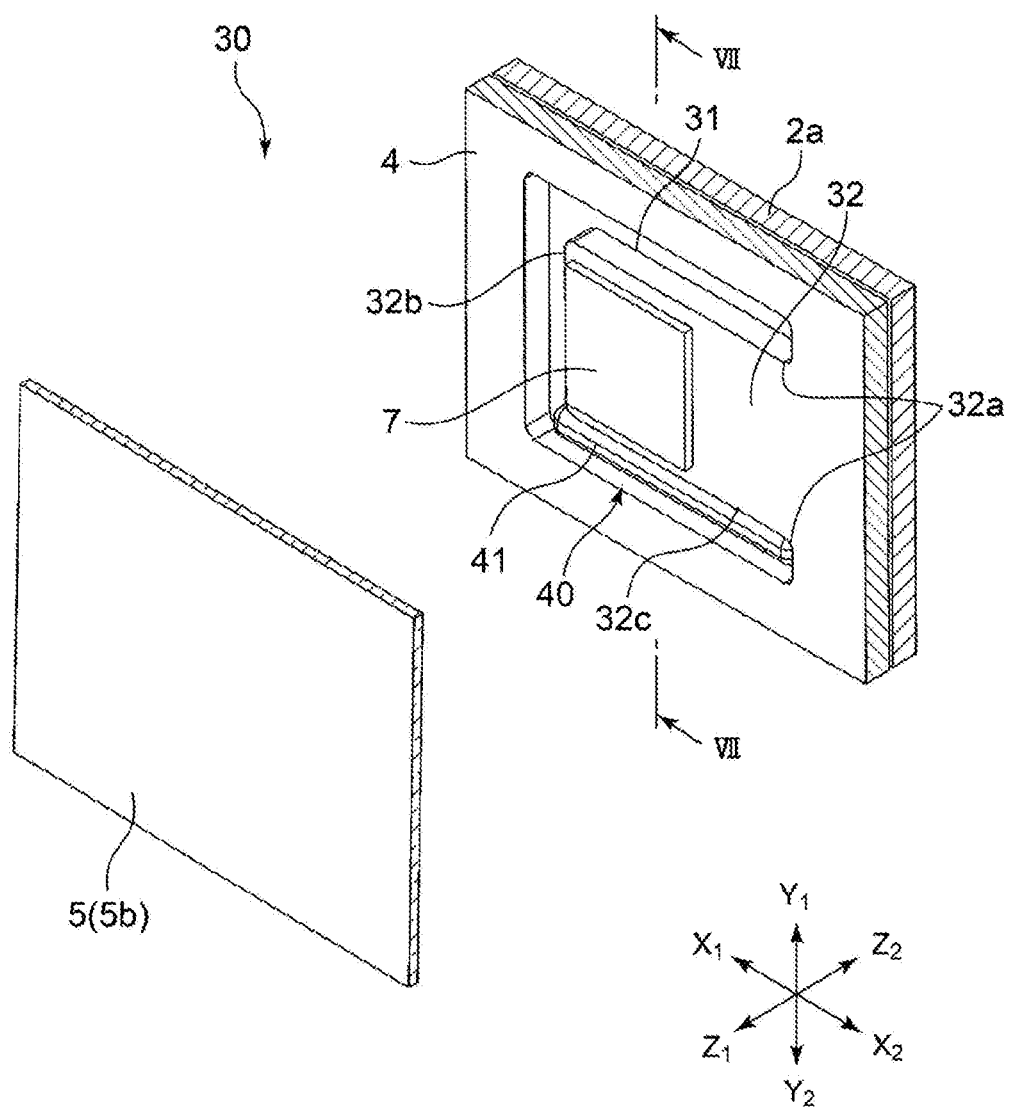
FIG. 6 is a partially exploded perspective view illustrating a modification of the second bonding portion illustrated in FIG. 5.
Figure 7:
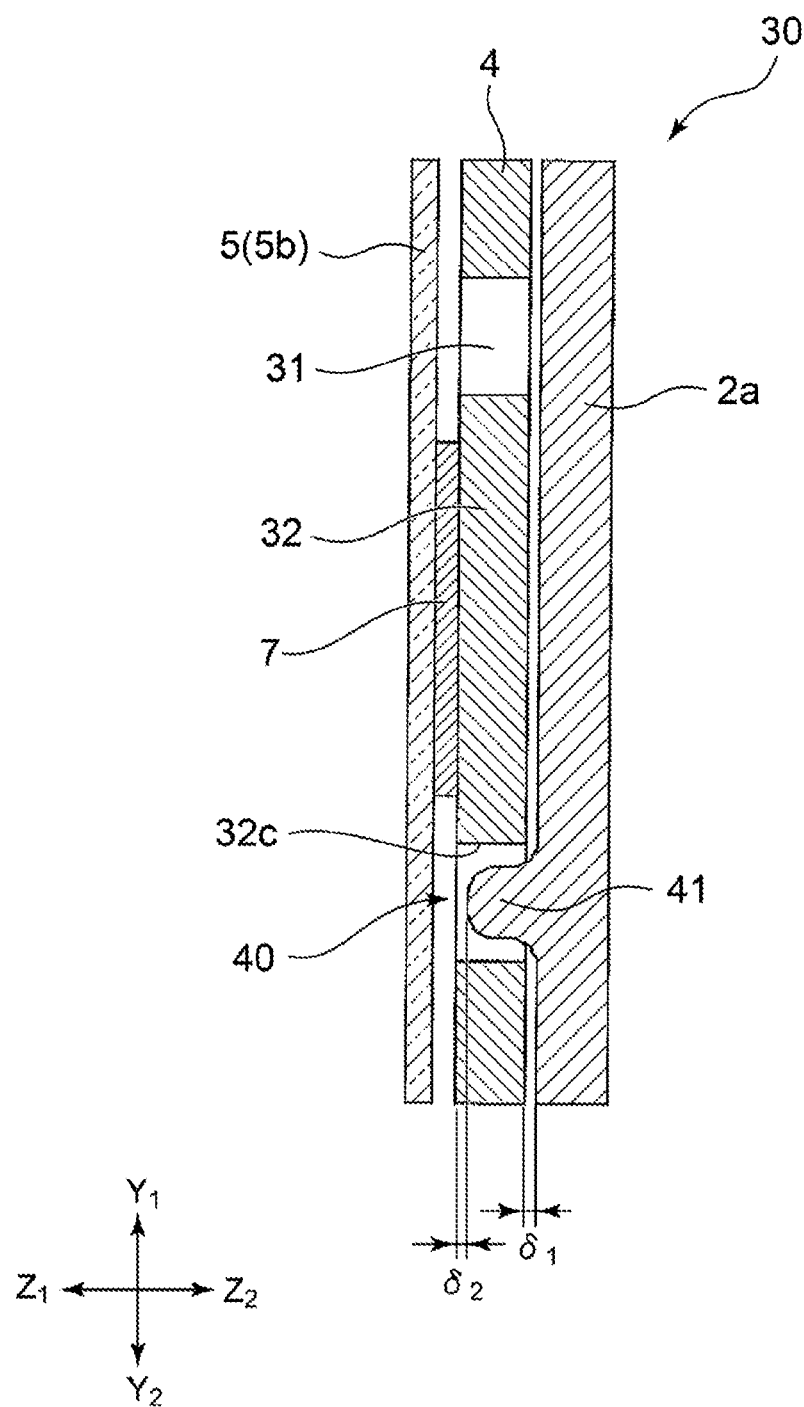
FIG. 7 is a cross-sectional view taken along a line VII-VII of a bonding state at the second bonding portion illustrated in FIG. 6.

FIGS. 6 and 7 illustrate a first modification of the second bonding portion 30. In the second bonding portion 30, the free end 32b of the support piece 32 faces the lateral direction intersecting the gravity direction. Therefore, for example, when a great downward acceleration acts on the front panel 5 having a large mass, there is a risk that the support piece 32 may be greatly deformed downward with the proximal end 32a as a fulcrum so that the support piece 32 may be damaged. Therefore, a restriction mechanism 40 that restricts deformation of the support piece 32 in the gravity direction is provided in the second bonding portion 30 illustrated in FIGS. 6 and 7.

The restriction mechanism 40 illustrated in FIGS. 6 and 7 is integrally formed with a restriction protrusion 41 that protrudes to the front side from a surface facing the front side (the Z1 direction) of the rear member 2a. The restriction protrusion 41 is a long protruding portion that extends in the lateral direction (the X1-X2 direction), extends in a direction along a side edge 32c facing the lower side in the support piece 32, and opposes the side edge 32c with a gap therebetween. When a great downward acceleration is applied to the front panel 5 so that the support piece 32 tries to be deformed downward, the side edge 32c hits the restriction protrusion 41, and thus, the support piece 32 can be prevented from being greatly deformed, and the damage of the support piece 32 can be prevented.

As illustrated in FIG. 7, it is preferable to set a protruding height of the restriction protrusion 41 such that a distal end thereof does not protrude beyond the surface facing the front side (the Z1 direction) of the support member 4. That is, if a distance from the distal end of the restriction protrusion 41 to the surface facing the front side (the Z1 direction) of the support member 4 is δ2, it is preferable that δ2≥0. With this setting, even when the front panel 5 is pushed toward the rear side and the support piece 32 is deformed until hitting the rear member 2a, the restriction protrusion 41 does not hit the front panel 5 which is a glass plate, and the front panel 5 can be prevented from being damaged.

Figure 8:
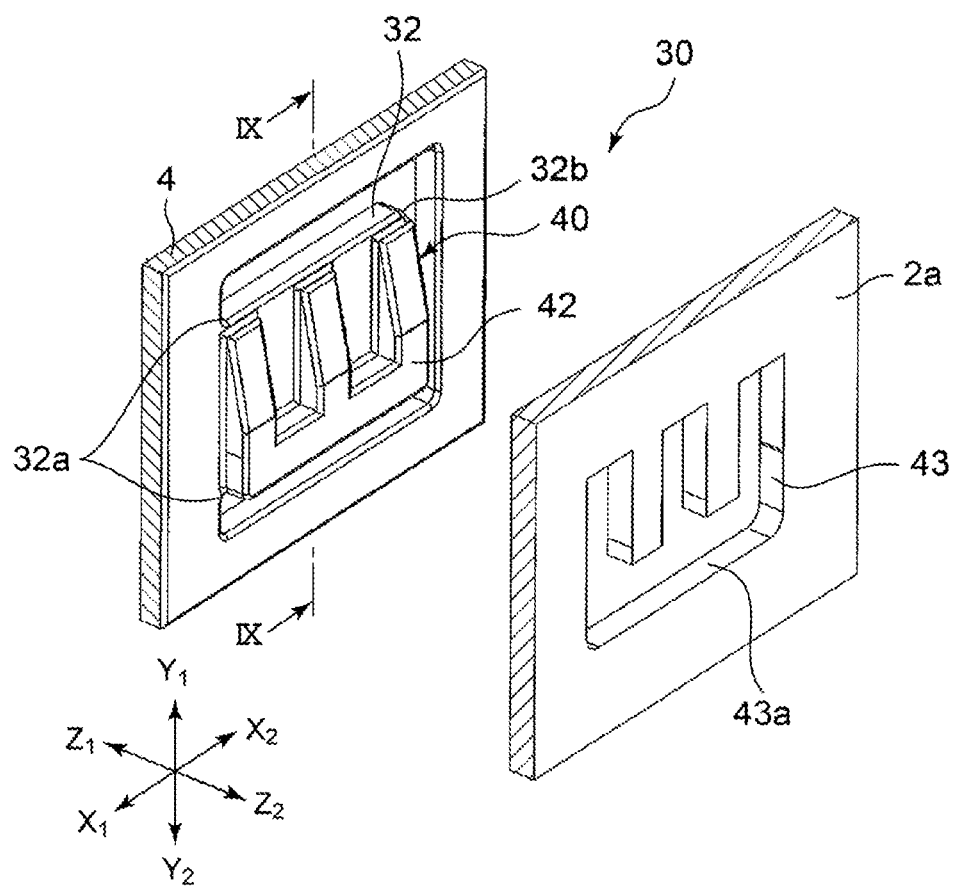
FIG. 8 is a partially exploded perspective view illustrating a modification of the second bonding portion illustrated in FIG. 5.
Figure 9:
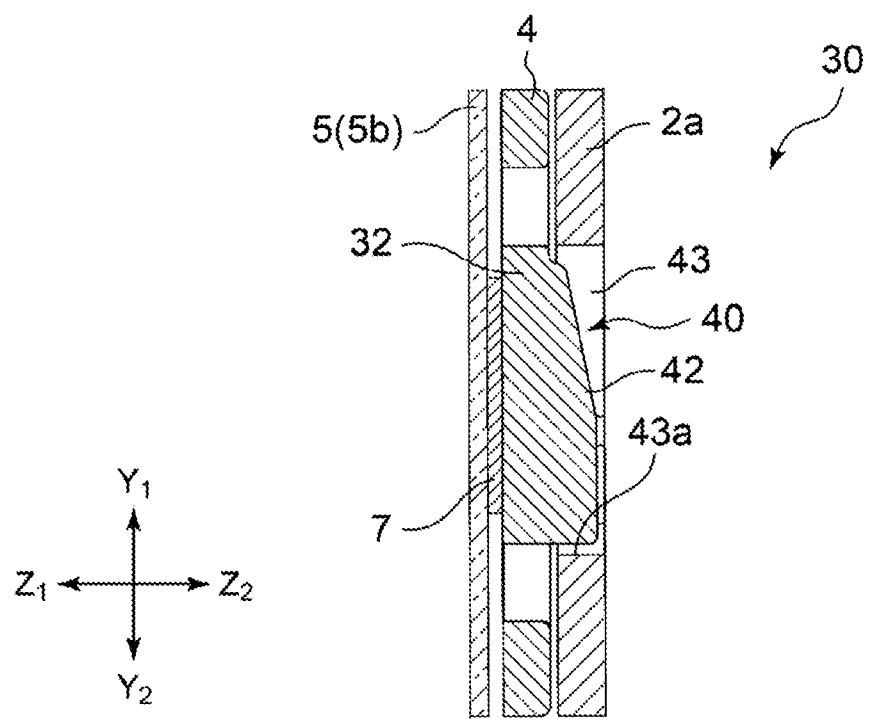
FIG. 9 is a cross-sectional view taken along a line IX-IX of a bonding state at the second bonding portion illustrated in FIG. 8.

FIGS. 8 and 9 also illustrate a modification of the second bonding portion 30. This second bonding portion 30 also has the restriction mechanism 40. The restriction mechanism 40 is integrally formed with a restriction protrusion 42 that protrudes further to the rear side from the surface facing the rear side (the Z2 direction) of the support piece 32 formed in the support member 4. A restriction hole 43 or a restriction recess is formed in the rear member 2a, and a lower edge of the restriction hole 43 or the restriction recess serves as a restricting portion 43a. As illustrated in FIG. 9, the restriction protrusion 42 provided on the support piece 32 opposes the restricting portion 43a from above.

Even in the second bonding portion 30 illustrated in FIGS. 8 and 9, when a great downward acceleration is applied to the front panel 5 so that the support piece 32 tries to be deformed downward, the restriction protrusion 42 hits the restricting portion 43a of the restriction hole 43 or the restriction recess, and thus, the support piece 32 can be prevented from being damaged. Since the restriction protrusion 42 has a long shape extending in the vertical direction (the Y1-Y2 direction) in the second bonding portion 30, the strength of the restriction protrusion 42 in the vertical direction is high, and the restriction protrusion 42 can be prevented from being damaged even if the restriction protrusion 42 collides with the restricting portion 43a with a great acceleration.

As illustrated in the modification illustrated in FIGS. 6 and 7 and the modification illustrated in FIGS. 8 and 9, the restriction protrusion is formed on at least one of the support piece 32 and the rear member 2a in the restriction mechanism 40 so that the movement of the support piece 32 in the gravity direction is restricted by the abutment of the restriction protrusion when the support piece 32 has moved in the gravity direction.

Figure 10:
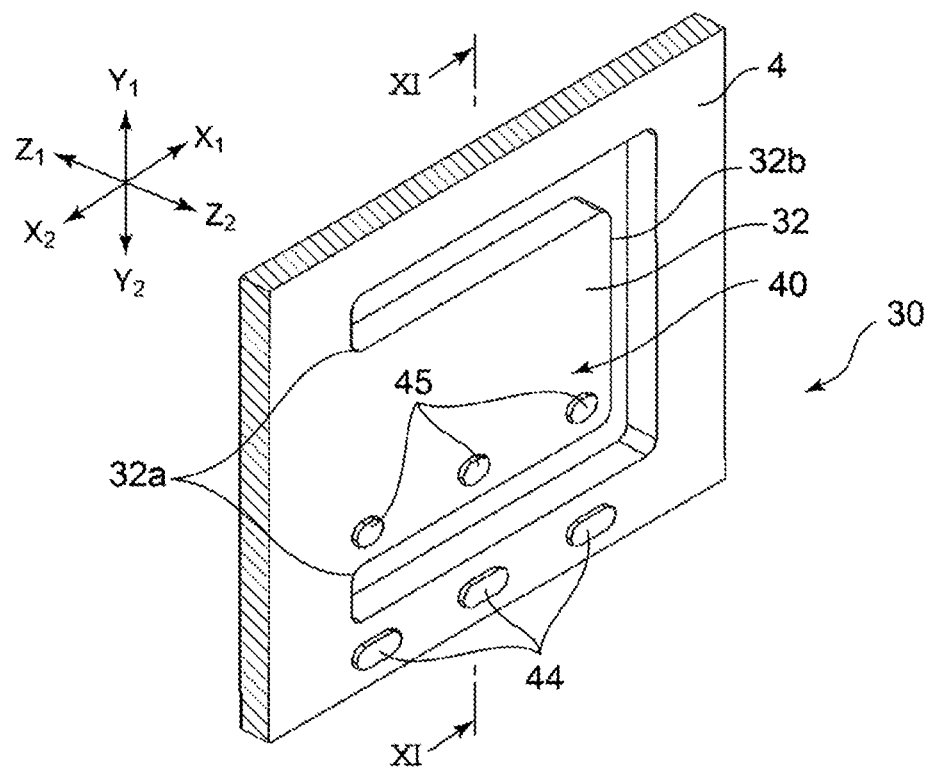
FIG. 10 is a partial perspective view illustrating a modification of a support piece provided in the second bonding portion illustrated in FIG. 5.
Figure 11:
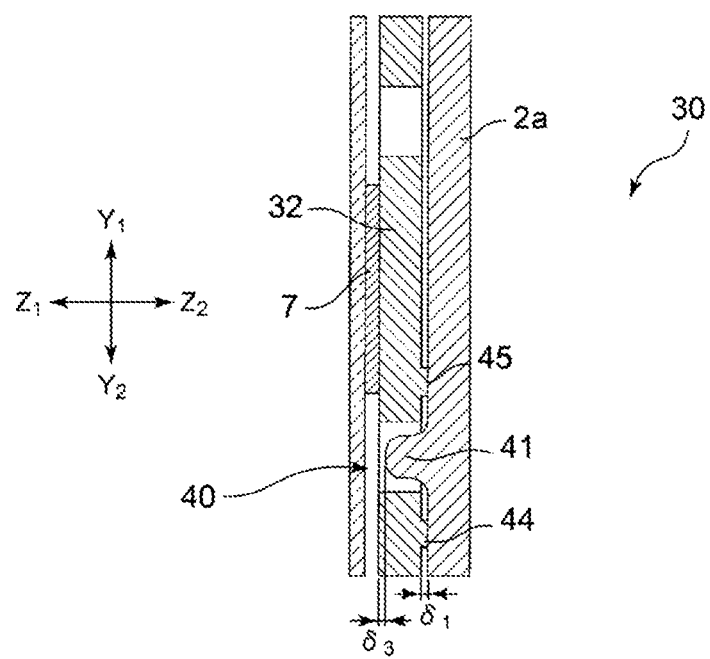
FIG. 11 is a cross-sectional view taken along a line XI-XI of the second bonding portion using the support piece illustrated in FIG. 8.

FIGS. 10 and 11 also illustrate a modification of the second bonding portion 30. In the restriction mechanism 40 provided in the second bonding portion 30, a restriction protrusion 41 is formed to protrude forward from the rear member 2a, and the restriction protrusion 41 opposes the side edge 32c facing the gravity direction of the support piece 32, which is similar to the modification illustrated in FIGS. 6 and 7. Spacer protrusions 44 are integrally formed on the surface facing the rear side (the Z2 direction) of the support member 4, and the spacer protrusion 44 abuts against the rear member 2a so that a dimension of the gap 61 between the support member 4 and the rear member 2a in the front-rear direction is defined with high accuracy. Further, the abutment protrusion 45 that protrudes to the rear side is provided on a surface facing the rear side of the support piece 32 formed on the support member 4.

In the second bonding portion illustrated in FIGS. 10 and 11, a protrusion height dimension of the abutment protrusion 45 is lower than a protrusion height dimension of the spacer protrusion 44 from a rear surface of the support piece 32. As a result, the abutment protrusion 45 hits the rear member 2a when the support piece 32 is deformed toward the rear member 2a so that it is possible to prevent the amount of deformation to the rear side (the Z2 direction) of the support piece 32 from becoming excessive even when the front panel 5 is pushed to the rear side. Even in the restriction mechanism 40, a distance 63 between the distal end of the restriction protrusion 41 and the surface facing the front side of the support member 4 is preferably set such that δ3≥0. Note that the spacer protrusion 44 and the abutment protrusion 45 may protrude to the front side from the rear member 2a. That is, the spacer protrusion 44 and the abutment protrusion 45 may be provided on at least one of the support piece 32 and the rear member 2a.

FIGS. 12A, 12B, 13A, and 13B illustrate various modifications of the support piece 22 provided in the first bonding portion 20 or the support piece 32 provided in the second bonding portion 30.

Figure 12A:
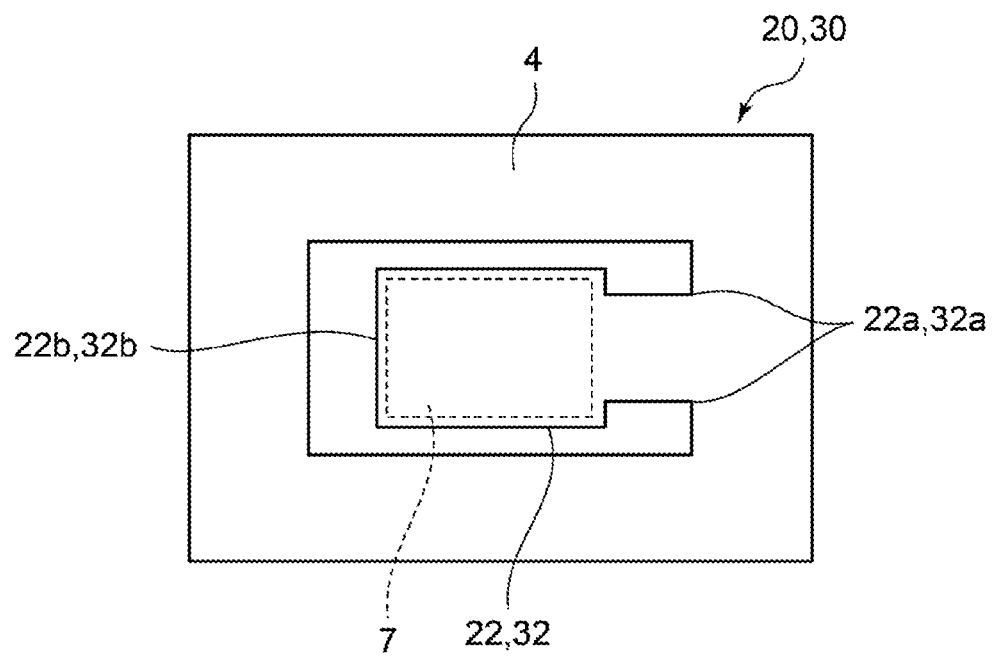
FIGS. 12A and 12B are front views illustrating another modification of the support piece used in the first bonding portion or the second bonding portion.
Figure 12B:
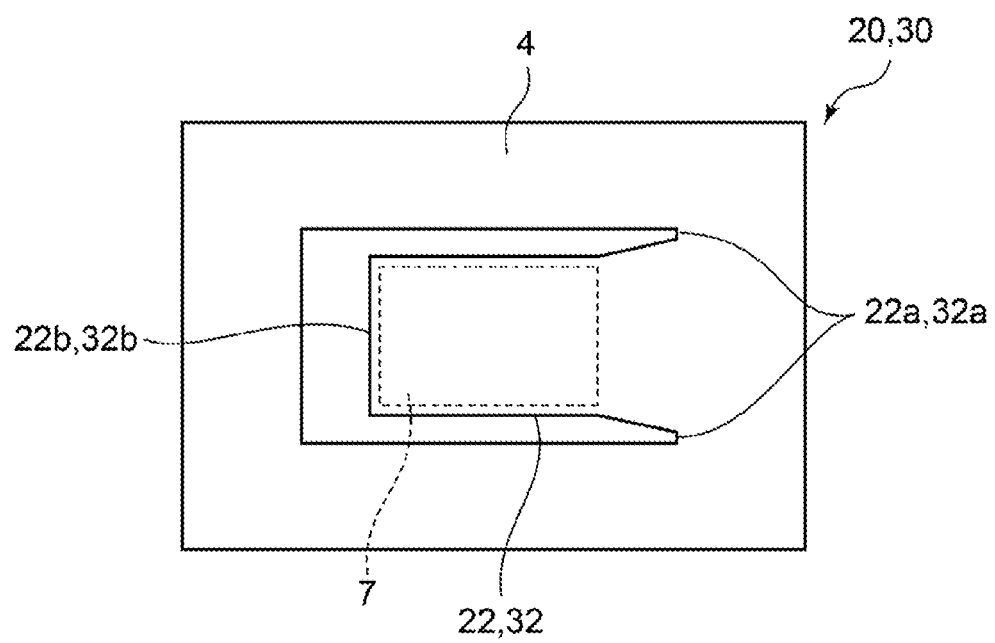

The support pieces 22 and 32 illustrated in FIG. 12A are easily bent and deformed since width dimensions of portions close to the proximal ends 22a and 32a are narrow. The support pieces 22 and 32 illustrated in FIG. 12B have width dimensions gradually increasing toward the proximal ends 22a and 32a so that the bending rigidity is enhanced.

Figure 13A:
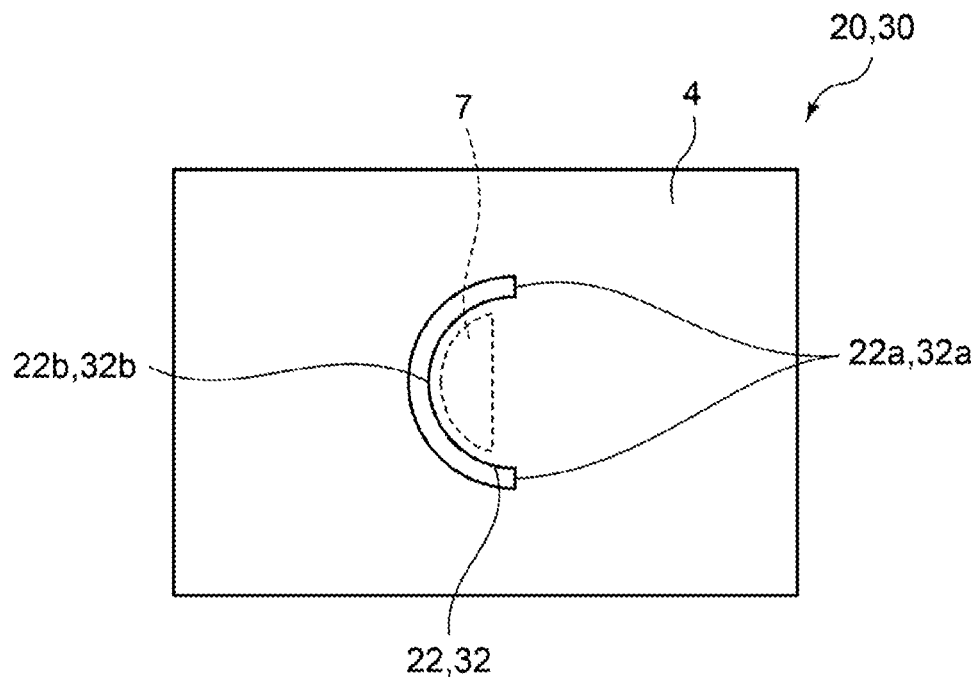
FIGS. 13A and 13B are front views illustrating still another modification of the support piece used in the first bonding portion or the second bonding portion.
Figure 13B:
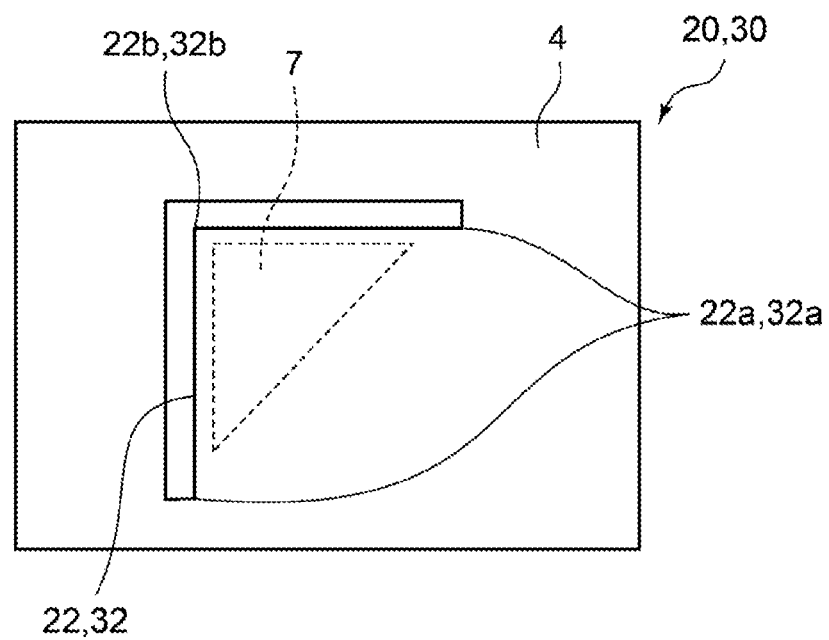

The support pieces 22 and 32 illustrated in FIG. 13A have curved portions, such as arcs, at edges thereof. The support pieces 22 and 32 illustrated in FIG. 13B are triangular.

In this manner, the support pieces 22 and 32 may have any shape as long as the support pieces 22 and 32 are continuous with the other portions of the support member 4 at the proximal ends 22a and 32a and the free ends 22b and 32b that are not continuous with the other portions of the support member 4 are formed at positions separated from the proximal ends 22a and 32a. The second adhesive layer 7 is disposed at a position closer to the free ends 22b and 32b than the proximal ends 22a and 32a.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising: a display unit having a display cell; and a light-transmissive front panel located on a front side of the display unit, the front side of the display unit being a display direction, wherein a support member is provided alongside of the display unit in at least one of a lower side or an upper side of the display unit in a gravity direction or a lateral direction from the display unit intersecting the gravity direction, and the support member includes openings that define support pieces having free ends which are elastically deformable in a direction intersecting a surface of the front panel, and wherein a surface of the front panel facing a rear side opposite to a-the display direction is bonded to both the front side of the display unit and a front side of the support pieces.

2. The display device according to claim 1, wherein the free ends of the support pieces face a lower side or an upper side which is a gravity direction.

3. The display device according to claim 1, wherein the free ends of the support pieces face a lateral direction which is a direction intersecting a gravity direction.

4. The display device according to claim 3, wherein the support pieces are provided on both sides of the display unit, respectively, and wherein the free ends face directions of separating from each other between the support piece provided on one side and the support piece provided on another side with the display unit interposed therebetween.

5. The display device according to claim 3, wherein a rear member is provided on a rear side opposite to a display direction of the support member, and wherein a restriction mechanism that restricts deformation of the support piece in the gravity direction is provided between the support piece and the rear member.

6. The display device according to claim 5, wherein the rear member is provided on the rear side opposite to the display direction of the support member, and wherein a gap in a front-rear direction is formed between the support piece and the rear member.

7. The display device according to claim 6, wherein at least one of the support piece and the rear member is provided with an abutment protrusion that restricts the support piece from approaching the rear member.

8. A display device comprising: a display unit having a display cell; and a light-transmissive front panel located on a front side of the display unit, the front side of the display unit being a display direction, and extending beyond an edge of the display unit, wherein a support member is provided alongside of the display unit in at least one of a lower side or an upper side of the display unit in a gravity direction or a lateral direction from the display unit intersecting the gravity direction, and the support member includes an opening that defines a support piece having a free end which is elastically deformable in a direction intersecting a surface of the front panel, and wherein a surface of the front panel facing a rear side opposite to a-the display direction is bonded to both the front side of the display unit and a front side of the support piece.

9. The display device according to claim 8, wherein the free end of the support piece faces a lower side or an upper side which is a gravity direction.

10. The display device according to claim 8, wherein the free end of the support piece faces a lateral direction which is a direction intersecting a gravity direction.

11. The display device according to claim 10, wherein a support piece is provided on each side of the display unit, respectively, and wherein the free ends of the support pieces face directions of separating from each other between the support piece provided on one side and the support piece provided on another side with the display unit interposed therebetween.

12. The display device according to claim 8, wherein a rear member is provided on a rear side opposite to a display direction of the support member, and wherein a restriction mechanism that restricts deformation of the support piece in the gravity direction is provided between the support piece and the rear member.

13. The display device according to claim 12, wherein the rear member is provided on the rear side opposite to the display direction of the support member, and wherein a gap in a front-rear direction is formed between the support piece and the rear member.

14. The display device according to claim 13, wherein at least one of the support piece and the rear member is provided with an abutment protrusion that restricts the support piece from approaching the rear member.

* * * * *